Patented Mar. 29, 1932

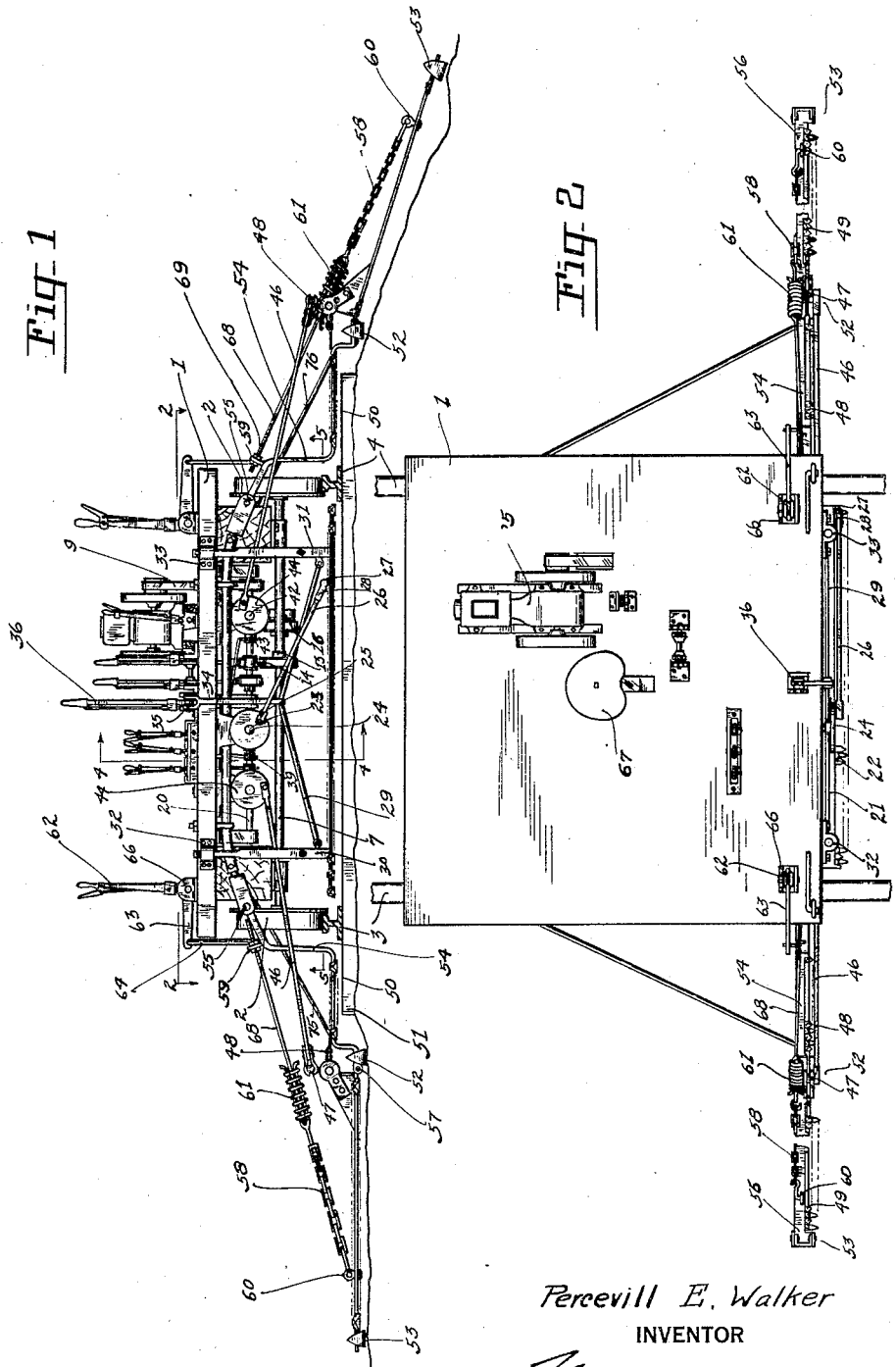

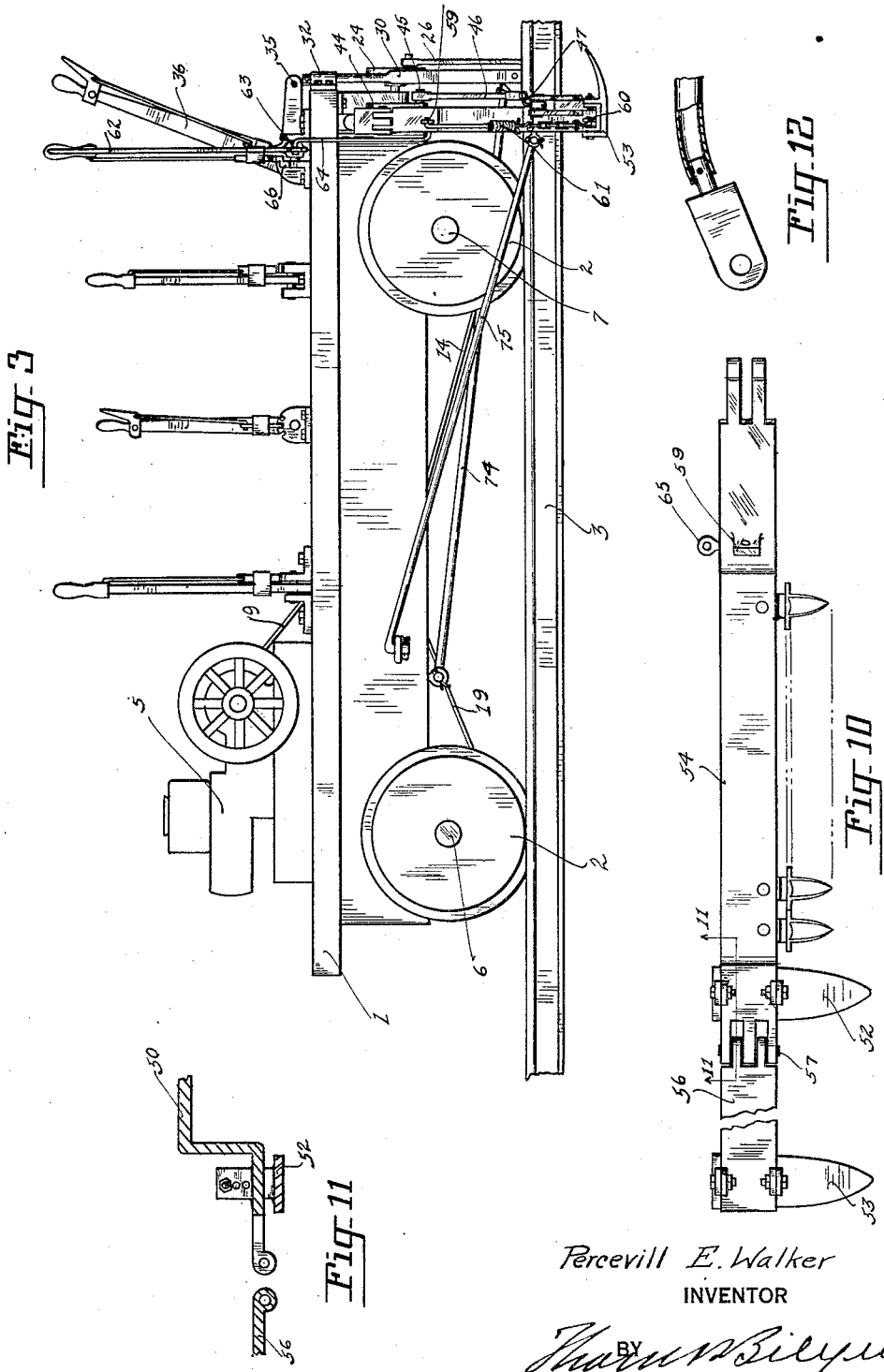

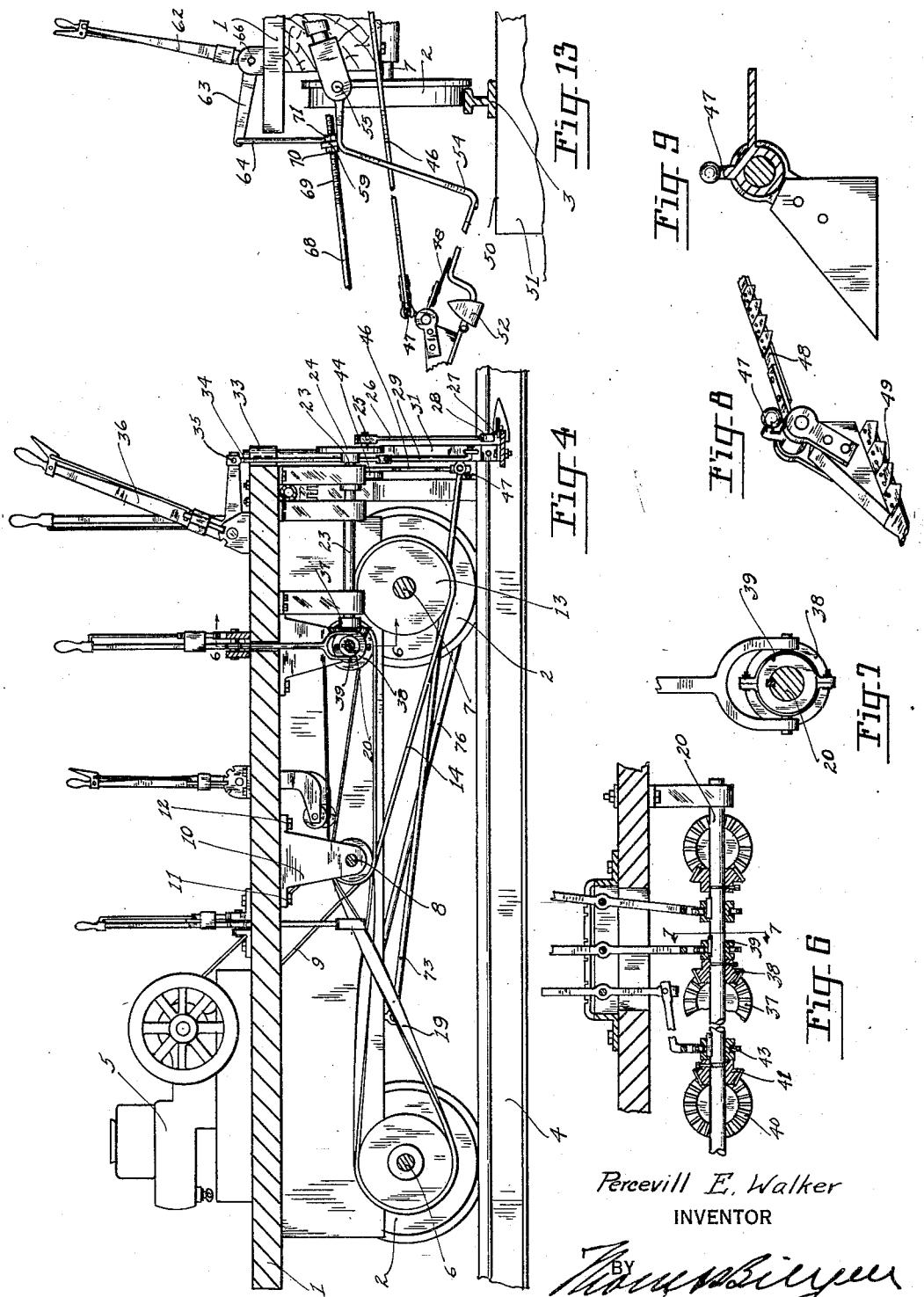

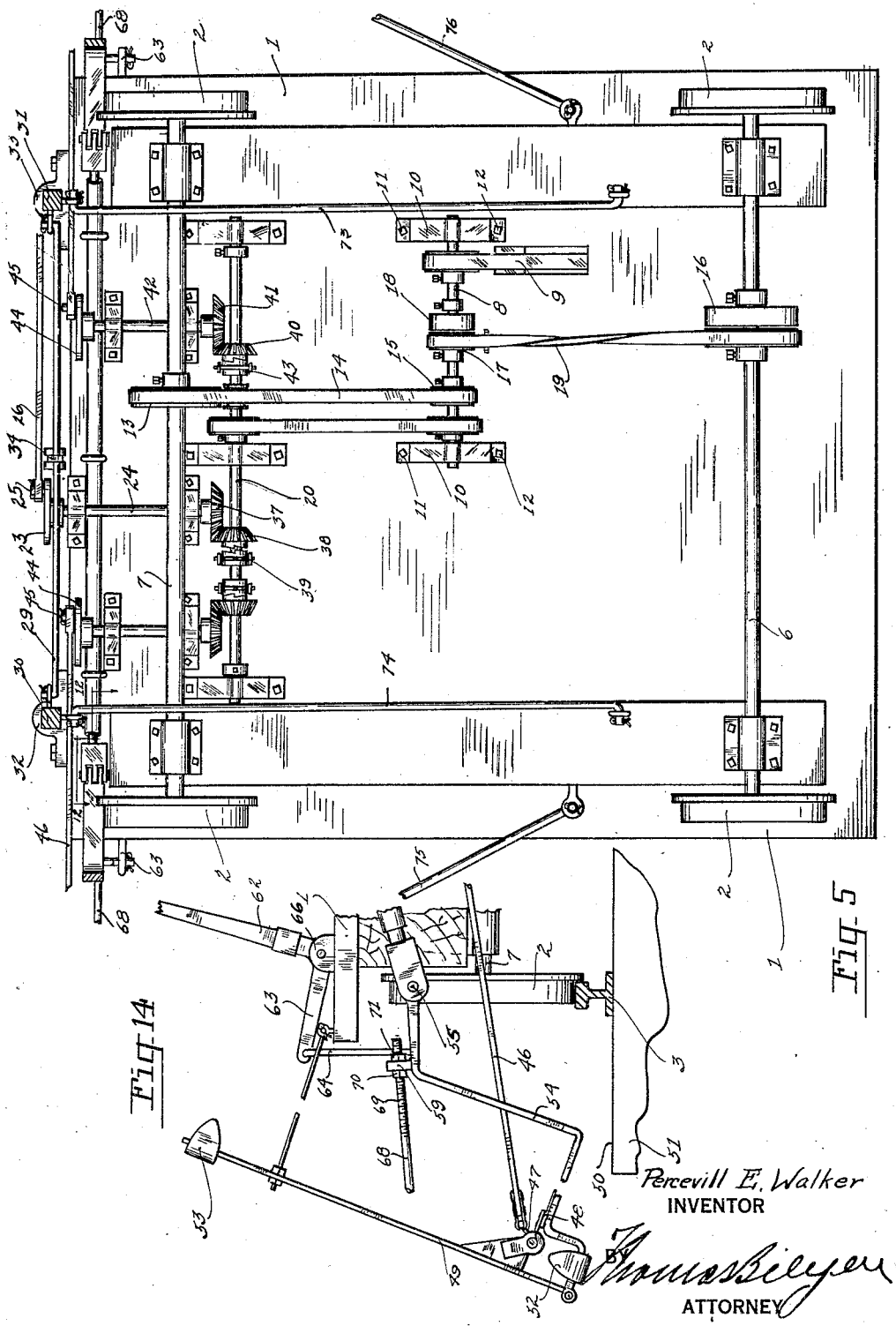

1,851,337

UNITED STATES PATENT OFFICE

PERCEVILL E. WALKER, OF HOLBROOK, OREGON

MOWING MACHINE

Application filed February 11, 1931. Serial No. 515,045.

My invention is intended for use in the cutting of vegetation between the tracks and outside of the rails of railways and consists primarily of a flat car having a prime mover mounted thereupon for propelling the same and having a plurality of cutter heads adapted for cutting the vegetation between the rails and adjacent the ties with means for raising and lowering the cutting head disposed between the rails.

A second pair of cutting heads are supported upon the car adapted for cutting outside of the rails to the length of the ties with one cutting head and having hingedly secured thereto, a second cutting head adapted for cutting a limited distance beyond the end of the ties. Means being provided for raising and lowering the cutter heads disposed outside of the rail and for placing the hinged portion of cutting head to the desired angle to meet the requirements and grades.

Independent means are provided for driving each one independently and all of the cutter heads at one time; means is further provided for driving the flat car in either direction.

The object of my invention is to provide a self-propelling mowing machine for the cutting of vegetation adjacent and between the tracks of railways.

A further object of my invention consists in providing a self-propelling mowing machine having selective speeds at which the same may be driven and providing a mowing machine that will cut the vegetation adjacent the tracks on either side and between the rails, in a single passage over the rails.

A still further object of my invention consists in providing a mowing machine that is self-propelling and that may be operated for the purpose intended with a minimum number of operators.

A still further object of my invention consists in providing a mowing machine for railway use that may be used in the cutting of a substantial mileage per hour, to thereby limit the cost of the cutting of the vegetation along railway tracks of railway systems.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a front view of the assembled device.

Fig. 2 is a sectional top, plan view of the assembled device the same being taken on line 2—2 of Fig. 1, looking in the direction indicated.

Fig. 3 is a side view of the assembled device.

Fig. 4 is a sectional, side view of the assembled device, the same being taken on line 4—4 of Fig. 1, looking in the direction indicated.

Fig. 5 is an inverted, plan view of the assembled device.

Fig. 6 is a fragmentary, sectional, side view of the drive mechanism.

Fig. 7 is a fragmentary, sectional, end view of the mechanism illustrated in Fig. 6, the same being taken on line 7—7 of Fig. 6, looking in the direction indicated.

Fig. 8 is a perspective, front view of the hinged sickle head that is disposed upon the cutting head outside of the rail and adapted for cutting above the tie and outward on the right of way from the end of the tie.

Fig. 9 is a sectional, side view of the mechanism illustrated in Fig. 8.

Fig. 10 is a top, plan, view of the cutting head disposed about the outside of the rail.

Fig. 11 is a sectional, side view of the hinged joint connecting the cutter bar disposed about the outside of the tie to the cutter bar disposed above the tie, the same being taken on line 11—11 of Fig. 10, looking in the direction indicated.

Fig. 12 is a fragmentary, side view of the supporting rod for supporting the hinged cutter head assembly.

Fig. 13 is a fragmentary, front view of the support for supporting, adjusting and raising the hinged cutter head assembly disposed about the outside of the rail.

Fig. 14 is a fragmentary, front view of the mechanism illustrated in Fig. 13, and illustrating the hinged cutter head raised and in inoperative position.

Like references characters refer to like parts throughout the several views.

My device is intended for use in the clearing of railway trackage of vegetation and therefore is to be mounted upon a flat car 1 having wheels 2 disposed thereupon for riding the rails 3 and 4 of the trackage. A prime mover, as a gas engine 5 is mounted upon the platform of the flat car. The wheels of the flat car are mounted upon axles 6 and 7. A jack shaft 8 is disposed transversely of the car and is adapted for being driven by the prime mover, through any suitable drive elements as through the use of a belt or chain 9.

While I have shown the drive as being driven by a belt or chain I do not wish to be limited to this form of drive, as the same may be driven with equal facility through the use of coacting gears and shafts, or by any other suitable driving mechanism.

The jack shaft 8 is mounted upon a bracket 10 that depends from the underside of the platform and is secured thereto by any suitable fastening means as through the use of bolts 11 and 12.

A driving pulley 13 is mounted upon the front axle 7 and a driving element as a chain or belt 14 is trained about a suitable pulley 15 that is mounted upon the jack shaft 8. A pulley or sprocket 16 is mounted upon the shaft 6 and a tight pulley 17 and a lose pulley 18 are mounted adjacent each other upon the shaft 8 and a suitable driving element as a belt 19 is trained about the respective tight and loose pulleys 17 and 18 and the pulley 16, mounted upon the shaft 6. This drive assembly permits the forward and back movements of the car upon the track through the use of suitable belt shifters and belt tighteners. A second jack shaft 20 is mounted within the frame of the car and driving clutches are mounted upon the shaft 20. The shaft 20 being journaled within suitable journal boxes secured to the car platform and spaced apart to maintain the shaft in alignment and in position.

A cutter bar 21 is disposed central of the car and is of sufficient length to be placed between the rails 2 and 3. A sickle bar 22 is reciprocably disposed upon the cutter bar with guards being disposed upon the cutter bar through which the sickle bar is reciprocated.

A crank disk 24 is mounted upon the shaft 23 and a crank pin 25 is secured to the crank disk 24. A pitman rod 26 connects the crank pin 25 with a wrist pin 27 that is secured to the sickle bar, and the driving disk and as the pitman rod is reciprocated, the sickle bar is also reciprocated. A slip joint is disposed between the primary rod and the sleeve 28 and compensates for the difference in the spacing between the wrist pin 27 and the pitman rod 26. The cutter head assembly is suspended upon a yoke 29 that is secured upon its oppositely disposed ends to guide bars 30 and 31. The guide bars 30 and 31 pass upward through guideways 32 and 33 that are secured directly to the primary frame of the car.

A link is connected upon its one end to the yoke 29 and upon its oppositely disposed end, to a pin 35. The pin 35 is secured to a lever 36, the purpose of which is to raise and lower the cutter head to the desired cutting elevation. A quadrant is associated with the lever 36 for supporting the cutter head at the desired elevation. Coacting gears 37 and 38 are mounted upon the shafts 23 and 24, respectively, and a clutch 39 is mounted upon the shaft 20, the purpose of which is to render the coacting gears operative and inoperative at the will of the operator of the mowing machine.

Sickle bars are disposed at the oppositely disposed sides of the car. The innermost sickle bar of each pair of heads is adapted to cut to the outer length of the tie and between the outer surface of the rail and the tie and the outer one of the sickle bars of each pair, is adapted to cut at a different elevation and beyond the length of the tie to the desired length to be cut for the particular use to which the same is to be adapted. Means being provided for raising the cutter head assembly as a whole, or for raising the outer one independently of the inner one, or for inclining the cutting angle of the outer sickle bar independent of the inner one. The outer sickle bar and cutter head assembly is hingedly secured relative to the inner sickle bar and cutter head assembly. Each of the sickle bars disposed at the oppositely disposed sides of the mowing machine are adapted for being driven by a common driving element. Coacting gears 40 and 41 are mounted respectively upon the shaft 20 and the shaft 42 and a clutch assembly 43 is mounted upon the shaft 20 and is adapted to render the driving of the shaft 42 inoperative at the will of the operator of the device.

A disk 44 is mounted upon the outer end of the shaft 42 and a crank pin 45 is secured to the disk. A pitman rod 46 is secured to the crank pin 45 upon its one end and to a bell crank 47 upon its oppositely disposed end. The bell crank 47 is secured to and adapted for reciprocating the sickle bars 48 and 49 respectively, each being an independent sickle bar and adapted for being operated at different elevations, to cut the vegetation at different elevations, adjacent the track and tie, and particularly adjacent that portion of the tie 50, lying outside of the rail. The vegetation lying just outside the rail is required to be cut at a higher elevation than the right-of-way disposed at the outside of the outer end 51 of the tie.

Shoes 52 and 53 are disposed immediately below the cutter head assembly and each of the shoes are adapted for engaging the surface of the earth adjacent the outer end of the railway ties.

The cutter head assembly disposed at either side of the car is comprised of two independent sickle bars and cutter bars associated therewith, the same being hingedly secured together. The inner end of the cutter bar 54, illustrated in Fig. 10 is adapted for being hingedly secured about a supporting pin 55 and the outer cutter bar assembly 56 is hingedly secured, relative to the cutter bar 54, about a suitable journal pin 57 to thus form an outer cutter bar assembly, that may be manually raised independently of the raising of the inner cutter bar assembly 54. The outer cutter bar assembly may be flexibly supported by a chain or cable 58 and a tension rod 68, one end of which is fastened to a lug 59 outwardly extending from the cutter bar 54, the oppositely disposed end being secured to a lug 60 secured to the outer cutter bar with a reacting element 61, as a coil spring disposed therebetween. A relatively long thread 69 is disposed upon one end of the tensioning rod 68 and locking nuts 70 and 71 are disposed at the oppositely disposed sides of the lug 59 in order to properly tension the rod 68 and to maintain the cutter bar in precise elevation.

A lever 62 is adapted for raising and lowering the pair of sickle bar assemblies. An arm 63 is disposed at right angles to the lever 62. A link 64 connects the arm 63 with the lug 65 that outwardly extends from the inner end of the cutter bar assembly 54. A quadrant 66 is associated with the hand lever 62 for maintaining the sickle bar assembly in desired placed position and elevation.

Since the oppositely disposed pairs of sickle bars are similar excepting that the same are right and left hand, but one side is described.

A seat 67 is placed conveniently upon the car platform, in order that the operator of the device may sit central of the levers and manipulate the same.

Strut rods 73 and 74 are secured upon their one end to the under side of the sill of the car frame and upon their oppositely disposed ends to lugs, that upwardly extend from the central cutter head assembly, to thereby maintain the cutter head assembly in position and alignment and to absorb any shocks that may be imparted to the cutter head assembly. Struts 75 and 76 also connect the cutter head assembly disposed upon the outside of the car platform to the frame of the car for absorbing any shocks that may be imparted to the side cutter head assembly.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What I claim is:

1. A device of the class described, comprising a flat car, a prime mover disposed upon the platform of the flat car, a jack shaft mounted within brackets depending from the underside of the platform, coacting elements disposed upon the axles of the flat car and the jack shaft for propelling the car in either direction, selective means for manually predetermining the direction of travel of the flat car, a plurality of cutter heads disposed upon the forward end of the flat car and adapted for being operated at each side and center of the flat car, independent means for raising and lowering each of the cutter heads, means for driving the cutter heads, and selective means for predetermining which of the cutter heads are to be driven.

2. A device of the class described, comprising a flat car, a prime mover mounted upon the flat car, selective means for predetermining the direction of travel of the flat car, a cutter head assembly disposed central of the flat car and adapted for cutting vegetation between the rails upon which the flat car travels, manually settable means for predetermining the elvation at which the cut is to be made, a cutter head disposed at either side of the flat car and adapted for cutting vegetation outside of the rail, means associated with the cutter head assembly for cutting at different elevations, means for hinging a part of the cutter head assemblies, relative to the other of the parts of the cutter head assemblies and means for driving each of the cutter head assemblies disposed on each side of the flat car independently.

PERCEVILL E. WALKER.